(12) United States Patent
Novak et al.

(10) Patent No.: US 10,439,851 B2
(45) Date of Patent: Oct. 8, 2019

(54) FREQUENCY-INDEPENDENT RECEIVER AND BEAMFORMING TECHNIQUE

(71) Applicant: Ohio State Innovation Foundation, Columbus, OH (US)

(72) Inventors: Markus H. Novak, Columbus, OH (US); Satheesh Bojja Venkatakrishnan, Columbus, OH (US); John L. Volakis, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 49 days.

(21) Appl. No.: 15/708,992

(22) Filed: Sep. 19, 2017

(65) Prior Publication Data

US 2018/0083813 A1   Mar. 22, 2018

Related U.S. Application Data

(60) Provisional application No. 62/397,330, filed on Sep. 20, 2016.

(51) Int. Cl.
| | |
|---|---|
| *H04B 7/08* | (2006.01) |
| *H04L 27/14* | (2006.01) |
| *H01Q 3/42* | (2006.01) |
| *H04B 7/06* | (2006.01) |
| *H04B 1/38* | (2015.01) |

(52) U.S. Cl.
CPC ............ *H04L 27/14* (2013.01); *H01Q 3/42* (2013.01); *H04B 1/38* (2013.01); *H04B 7/0617* (2013.01); *H04B 7/084* (2013.01); *H04B 7/0837* (2013.01)

(58) Field of Classification Search
CPC .......... H01Q 3/42; H04B 1/38; H04B 7/0617; H04B 7/0837; H04B 7/084; H04L 27/14
USPC ................................................... 375/259–352
See application file for complete search history.

(56) References Cited

U.S. PATENT DOCUMENTS

| | | | | |
|---|---|---|---|---|
| 3,238,528 | A * | 3/1966 | Hines | H01Q 3/30 327/232 |
| 3,307,188 | A * | 2/1967 | Marchetti | H01Q 3/42 331/38 |
| 3,683,386 | A * | 8/1972 | Leysieffer | G01S 3/42 342/424 |
| 5,631,898 | A * | 5/1997 | Dent | H01Q 1/246 342/373 |

(Continued)

*Primary Examiner* — James M Perez
(74) *Attorney, Agent, or Firm* — McDonnell Boehnen Hulbert & Berghoff LLP (57) ABSTRACT

Example systems and methods described herein relate to radio communication architectures and techniques for beamforming and down-conversion without a priori knowledge of the source location or frequency. An example radio receiver includes a plurality of antenna elements that include a first element, a second element, and a third element. The radio receiver also includes a plurality of mixers coupled to the plurality of antenna elements and a combiner coupled to the plurality of antenna elements. A signal incident on the first element is mixed with itself via a first mixer of the plurality of mixers. An output of the first mixer is mixed with a signal incident on the second element via a second mixer of the plurality of mixers, and an output of the second mixer is combined via the combiner with a signal incident on the third element.

7 Claims, 9 Drawing Sheets

(56) References Cited

U.S. PATENT DOCUMENTS

| | | | | |
|---|---|---|---|---|
| 5,952,964 | A * | 9/1999 | Chan | H01Q 3/22 342/368 |
| 6,104,343 | A * | 8/2000 | Brookner | H01Q 3/26 342/372 |
| 6,377,558 | B1 * | 4/2002 | Dent | H01Q 3/40 342/354 |
| 6,498,545 | B1 * | 12/2002 | Levi | H01Q 3/34 333/156 |
| 6,703,970 | B2 * | 3/2004 | Gayrard | H01Q 1/288 342/354 |
| 6,906,665 | B1 * | 6/2005 | Lam | H01Q 3/26 342/368 |
| 7,466,785 | B2 * | 12/2008 | Sanduleanu | H03L 7/087 375/371 |
| 7,570,696 | B2 * | 8/2009 | Maltsev | H04B 7/0634 375/260 |
| 7,590,198 | B2 * | 9/2009 | Sanada | H04B 1/7095 370/350 |
| 7,680,210 | B2 * | 3/2010 | Bode | H04L 27/0008 375/297 |
| 7,738,583 | B2 * | 6/2010 | Kim | H04B 7/0634 375/260 |
| 7,804,926 | B2 * | 9/2010 | Sanduleanu | H03D 13/003 327/157 |
| 7,865,152 | B2 * | 1/2011 | Brown | F41A 33/02 342/365 |
| 8,054,924 | B2 * | 11/2011 | Madhavan | H04L 25/0214 375/328 |
| 8,059,744 | B2 * | 11/2011 | Jin | H04B 7/0617 375/267 |
| 8,270,375 | B2 * | 9/2012 | Ylitalo | H01Q 3/26 370/334 |
| 8,340,167 | B2 * | 12/2012 | Feng | H04B 17/21 375/226 |
| 8,358,717 | B2 * | 1/2013 | Park | H04L 27/2273 375/261 |
| 8,391,376 | B2 * | 3/2013 | Uhl | H01Q 3/2605 343/700 MS |
| 8,478,344 | B2 * | 7/2013 | Rofougaran | H01L 23/66 307/125 |
| 8,749,430 | B2 * | 6/2014 | Shinonaga | H01Q 3/36 342/157 |
| 8,897,735 | B2 * | 11/2014 | Kim | H04B 1/525 375/148 |
| 8,917,759 | B2 * | 12/2014 | Xu | H04L 27/2272 375/214 |
| 9,035,828 | B2 * | 5/2015 | O'Keeffe | H01Q 1/246 342/368 |
| 9,143,211 | B2 * | 9/2015 | Pi | H04B 7/0465 |
| 9,246,719 | B2 * | 1/2016 | Pullela | H03D 7/165 |
| 9,325,553 | B2 * | 4/2016 | Kaukovuori | H04B 1/0057 |
| 9,596,120 | B2 * | 3/2017 | Yamanouchi | H03F 3/24 |
| 9,755,306 | B1 * | 9/2017 | Ogilvie | H01Q 3/28 |
| 9,791,552 | B1 * | 10/2017 | Schuman | G01S 7/4026 |
| 9,806,777 | B1 * | 10/2017 | Doostnejad | H04B 7/0456 |
| 9,813,269 | B1 * | 11/2017 | Yoon | H04B 1/40 |
| 9,872,374 | B2 * | 1/2018 | Poole | H05H 15/00 |
| 9,887,754 | B2 * | 2/2018 | Bhattad | H04B 7/0421 |
| 10,069,215 | B2 * | 9/2018 | Wang | H01Q 25/00 |
| 10,122,404 | B2 * | 11/2018 | Yoon | H04B 1/40 |
| 10,128,894 | B1 * | 11/2018 | O'Brien | H04B 17/14 |
| 2005/0287978 | A1 * | 12/2005 | Maltsev | H04B 7/0634 455/403 |
| 2006/0193401 | A1 * | 8/2006 | Lopez Villegas | H04L 27/2276 375/326 |
| 2007/0058754 | A1 * | 3/2007 | Lin | H03D 3/009 375/332 |
| 2007/0290930 | A1 * | 12/2007 | Krishnaswamy | H01Q 3/26 343/700 MS |
| 2008/0013445 | A1 * | 1/2008 | Siwiak | H01Q 21/24 370/206 |
| 2008/0297414 | A1 * | 12/2008 | Krishnaswamy | H01Q 3/28 342/368 |
| 2010/0208844 | A1 * | 8/2010 | Uhl | H04B 7/10 375/308 |
| 2011/0134972 | A1 * | 6/2011 | Zhu | H01Q 1/246 375/219 |
| 2013/0012144 | A1 * | 1/2013 | Besoli | H01Q 1/36 455/85 |
| 2016/0099613 | A1 * | 4/2016 | Bell | H02J 7/025 307/104 |
| 2016/0211906 | A1 * | 7/2016 | Woodsum | H04B 1/18 |
| 2016/0327641 | A1 * | 11/2016 | Madia | H01Q 1/3216 |
| 2016/0359533 | A1 * | 12/2016 | Obara | H04B 7/0408 |
| 2017/0033847 | A1 * | 2/2017 | Lomayev | H04B 7/0413 |
| 2017/0033853 | A1 * | 2/2017 | Kim | H04B 7/0417 |
| 2017/0047970 | A1 * | 2/2017 | Jesiolowski | H04B 7/0408 |
| 2017/0134083 | A1 * | 5/2017 | Kim | H04B 7/0456 |
| 2017/0207545 | A1 * | 7/2017 | Miraftab | H01Q 5/307 |
| 2017/0222333 | A1 * | 8/2017 | Sudo | H01Q 1/38 |
| 2017/0229775 | A1 * | 8/2017 | Navarro | H01P 3/16 |
| 2017/0238297 | A1 * | 8/2017 | Benjebbour | H04B 7/0404 370/329 |
| 2017/0310004 | A1 * | 10/2017 | Swirhun | H01Q 3/267 |
| 2018/0039154 | A1 * | 2/2018 | Hashemi | G02F 1/2955 |
| 2018/0053994 | A1 * | 2/2018 | Grando | H01Q 1/425 |
| 2018/0054006 | A1 * | 2/2018 | Wang | H01Q 21/24 |
| 2018/0083813 | A1 * | 3/2018 | Novak | H04B 1/38 |
| 2018/0109004 | A1 * | 4/2018 | Mu | H04B 7/0408 |
| 2018/0109306 | A1 * | 4/2018 | Mu | H04B 7/086 |
| 2018/0183509 | A1 * | 6/2018 | Luo | H04B 7/002 |
| 2018/0269576 | A1 * | 9/2018 | Scarborough | H01Q 1/288 |
| 2019/0017931 | A1 * | 1/2019 | Sertel | G01N 21/3581 |

* cited by examiner

FIG. 8A — SIGNAL UP-CONVERSION FOR TRANSMISSION

FIG. 8B — HETERODYNE DOWN-CONVERSION AT THE RECEIVER

FIG. 8C — DOWN-CONVERSION IN THE PROPOSED RECEIVER

CURRENT:

FIG. 10A

PROPOSED:

FREQUENCY-INDEPENDENT RECEIVER AND BEAMFORMING TECHNIQUE

CROSS-REFERENCE TO RELATED APPLICATIONS

The present application is a non-provisional patent application claiming priority to Provisional Patent Application No. 62/397,330, filed Sep. 20, 2016, the contents of which are hereby incorporated by reference.

BACKGROUND

Unless otherwise indicated herein, the materials described in this section are not prior art to the claims in this application and are not admitted to be prior art by inclusion in this section.

Some radio frequency ("RF") communication networks make use of omnidirectional antennas due to their simplicity and versatility. But for long distance or high data rate communications, high gain antenna arrays or reflectors may be used. This is particularly true for satellite or unmanned aerial vehicle communications, as well as high data rate millimeter-wave applications. Such antenna arrays generally make use of a technique called beamforming in order to increase gain.

Generally, beamforming is carried out by configuring an antenna array to transmit a focused waveform toward a receiving antenna array, and configuring the receiving antenna array to receive a focused waveform from a particular direction. In one particular example, the transmitting antenna array is configured to vary the phase or amplitude of the signal transmitted by each transmitting antenna of the array in order to generate the focused waveform. Likewise, each antenna of the receiving antenna array is configured to receive a signal of variable phase or amplitude and combine these signals together to reconstruct the focused waveform.

One potential drawback to current beamforming approaches is that the transmitter requires a priori knowledge of the intended target so that the receiver can appropriately point the beam. Likewise, the receiver requires a priori knowledge of the configuration and the transmission direction of the transmitting antenna array in order to successfully receive the focused waveform. If either the transmitter or receiver is moving, then mechanical steering or active electronic steering is typically used to maintain alignment. But these components tend to be bulky and expensive. Additionally, without such a priori knowledge mentioned above, and particularly in situations where the available spectrum is congested, the receiver faces a challenging scenario in attempting to operate in a dynamic, contentious environment with transmitters located at potentially arbitrary or unknown locations and transmitting on potentially arbitrary or unknown frequencies. Yet another drawback exists with current beamforming approaches: they tend to be band-limited. Thus, for systems that communicate across multiple bands, utilizing beamforming approaches dramatically increases costs.

SUMMARY

The present disclosure is directed to systems and methods that relate to radio communication architectures and techniques for beamforming and down-conversion without a priori knowledge of the source location or frequency.

In a first example embodiment, a radio receiver is provided. The radio receiver includes a plurality of antenna elements. The plurality of antenna elements includes a first antenna element, a second antenna element, and a third antenna element. The radio receiver also includes a plurality of mixers coupled to the plurality of antenna elements and a combiner coupled to the plurality of antenna elements. The plurality of antenna elements, the plurality of mixers, and the combiner are arranged such that a signal incident on the first antenna element would be mixed with itself via a first mixer of the plurality of mixers. An output of the first mixer is mixed with a signal incident on the second antenna element via a second mixer of the plurality of mixers. An output of the second mixer is combined via the combiner with a signal incident on the third element.

In a second example embodiment, a radio receiver is provided. The radio receiver includes an input, a first output, and a plurality of mixers arranged such that a received signal at the input of the radio receiver would be mixed with a second signal having a particular frequency. An output of the plurality of mixers is further mixed with the received signal and projected at the first output of the radio receiver.

In a third example embodiment, a demodulation method is provided. The demodulation method includes receiving, at a radio receiver, an input signal. The demodulation method also includes mixing, at a mixer, the input signal with itself, thereby obtaining a squared input signal. The demodulation method additionally includes converting the squared input signal to a digital input signal, the digital input signal comprising a series of bits. The demodulation method also includes suppressing alternate bits of the digital input signal beginning with a second bit of the series of bits of the digital input signal, thereby obtaining a differential digital input signal. The demodulation method further includes translating, with a translation circuit, the differential digital input signal to the input signal by detecting transitions in the series of bits of the differential digital input signal and outputting a translated signal that corresponds to the detected transitions, the translated signal being substantially similar to the input signal.

In a fourth example embodiment, an antenna array is provided. The antenna array includes a plurality of antenna elements arranged in a matrix. The matrix includes a number of columns and a number of rows. Each antenna element of the plurality of antenna elements exists at a position within the matrix at an intersection of a column and a row and each antenna element of the plurality of antenna elements includes a mixer configured to produce a phased superposition mix of a first signal and a second signal. The antenna array also includes a first set of phase shifters, each phase shifter of the first set of phase shifters being configured to apply a respective phase shift to an input signal. The antenna array also includes a second set of phase shifters, each phase shifter of the second set of phase shifters being configured to apply a respective phase shift to an input signal. The first set of phase shifters are arranged such that the first signal is applied with a same phase shift to each mixer of each antenna element in a respective row of the matrix. The second set of phase shifters are arranged such that the second signal is applied with a same phase shift to each mixer of each antenna element in a respective row of the matrix.

In a fifth example embodiment, a method is provided. The method includes applying a first signal to each antenna element of a plurality of antenna elements. The plurality of antenna elements are arranged in a matrix, which includes a number of columns and a number of rows. Each antenna element of the plurality of antenna elements exists at a position within the matrix at an intersection of a column and a row. The method includes applying a second signal to each antenna element of the plurality of antenna elements. The method also includes shifting a phase of the first signal such that for each application of the first signal to mixers positioned in a given column of the matrix, the first signal is applied with a same phase shift. The method yet further includes shifting a phase of the second signal such that for each application of the second signal to mixers positioned in a respective row of the matrix, the second signal is applied with a same phase shift. Additionally, the method includes at each respective antenna element of the plurality of antenna elements, mixing the phase-shifted first signal applied to the respective antenna element with the phase-shifted second signal applied to the respective antenna element.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

Disclosed herein are radio communication architectures and corresponding methods for beamforming and down-conversion without a priori knowledge of the source location or frequency. Because of the frequency independent nature of this architecture, the components thereof can be modular and used with many different applications, thus reducing development costs and time.

II. Frequency-Independent Receiver

Figure 1:
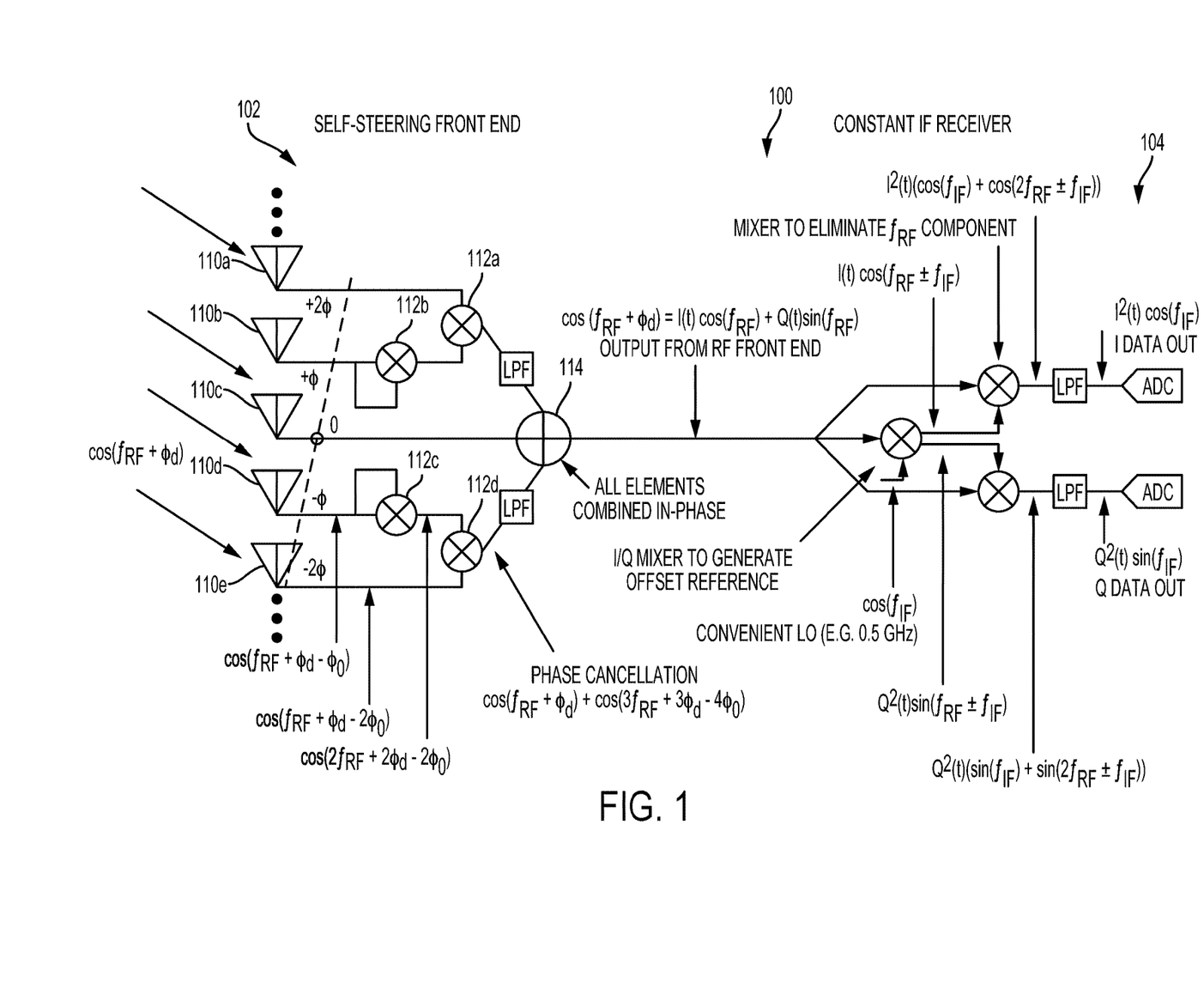
FIG. 1 illustrates a radio receiver, according to an example embodiment.

By way of example, one embodiment of the present disclosure is depicted as receiver 100 in FIG. 1. As depicted, receiver 100 includes a self-steering array 102 and a frequency-independent receiver 104 (also referred to herein as a "FIRE" or a "constant IF Receiver"). The architecture of receiver 100 is designed to improve spectrum agility, reduce power consumption, and provide adaptive communication devices capable of "selective attention." In one example, the self-steering array architecture 102 may engage in instantaneous beamforming without direction-of-arrival information. As such, this combines the low profile, high gain of a phased array with the low cost of an omnidirectional aerial antenna. In another example, the FIRE 104 may engage in down conversion to a constant intermediate frequency (IF), irrespective of the carrier frequency. As such, receiver 100 may operate without any local oscillator (LO) for real signals (i.e. ASK, BPSK). In an alternate embodiment, receiver 100 may operate with an arbitrary LO for quadrature signals (i.e. QPSK, QAM etc.). In such an embodiment, the LO's reference frequency may be selected from any low-frequency available sources.

Further, for sine waveforms, receiver 100 may operate as a power detector. However, for modulated signals, the output is squared at baseband. As such, phase and polarity information may be lost. To address this, disclosed herein is a demodulation technique designed to overcome this issue. In one implementation of the technique, receiver 100 recovers signal polarity by utilizing a specific digital zero-crossing detection procedure, which is described further herein. As such, receiver 100 can recover signals encoded by any modulation scheme.

As a general matter, increasing the gain of an antenna in one spatial direction tends to decrease the gain of the antenna in another spatial direction. Indeed, a "high gain, omnidirectional" antenna is a misnomer. However, an antenna array may be able to effectively provide hemispheric coverage, so long as the beam is able to find and track its target. This can be accomplished by using a phased array. In brief, a phased array is an antenna array, wherein each antenna (sometimes referred to as an antenna element, or simply an element) in the array uses a phase shifter to shift the phase of the signal radiated by that antenna element. In so doing, the phased array generates strategic constructive and destructive interference to thereby steer a waveform in a particular direction. But one drawback to phased arrays is that they tend to be prohibitively expensive (due to their complexity) and require large computational resources to manage.

As an alternative to phased arrays, the present disclosure utilizes a purely passive self-steering architecture (i.e., one that does not utilize phase shifters). In some embodiments, the self-steering architecture exists in the RF front end and may provide near-instantaneous high-gain beamsteering.

More particularly, but still by way of example, example self-steering front end 102, as depicted in FIG. 1, is arranged so that signals incident on the element pairs 110*a-b* and 110*d-e* opposite to the phase center 110*c* of the array are mixed via mixers 112*a-d*. Although FIG. 1 depicts just two element pairs 110*a-b* and 110*d-e* and a phase center 110*c*, other embodiments may have more or fewer element pairs. Example self-steering front end 102 is also depicted in isolated form in FIG. 3.

Figure 2:
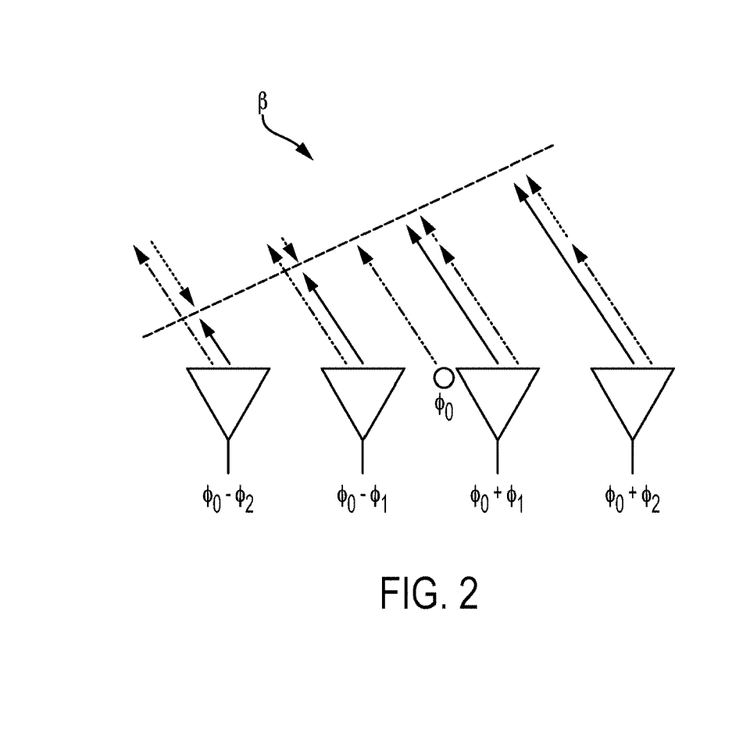
FIG. 2 illustrates a linear phase gradient across a plurality of array elements, according to an example embodiment.

Self-steering front end 102 is further configured to combine these signals from each array element 110*a-e* in phase via combiner 114. As such, for a wave incident at some angle, a linear phase gradient is formed across the array elements 110*a-e*. This is illustrated further in FIG. 2. As depicted in more detail in FIG. 2, symmetric to the phase center (referred to in FIG. 2 as $\phi_o$), these local phase mismatches are exactly opposite. Thus, when the pair of oppositely phased signals is fed into a mixer, the output contains up-converted and down-converted components. In the up-converted component, the RF frequency is doubled and the phase variations sum and cancel. The down-converted component is a DC voltage proportional to the angle of incidence, which, in some implementations can be used for direction of arrival estimation. This result is true for each element pair, emanating outward from a common phase center. As a result, output signals from each element pair are in phase and may thus be combined. Thus, for any angle of incidence, the phase variation between elements is eliminated in the feeding network, achieving beamforming gain.

Figure 4:
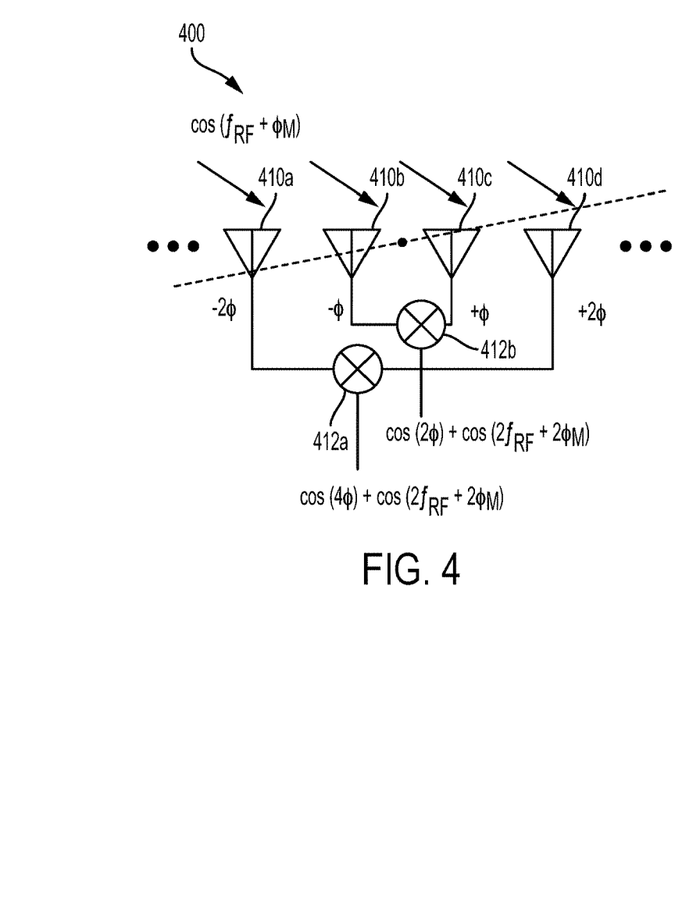
FIG. 4 illustrates a self-steering front end architecture, according to an example embodiment.

FIG. 4 depicts an alternative embodiment of a self-steering front end 400. In this embodiment, the self-steering front end 400 includes antenna elements 410*a-d* and mixers 412*a-b*. As depicted, self-steering front end 400 is arranged such that the signal frequency and any phase modulation of the received signal are doubled. In some implementations, this can be problematic because doubling of the phase may lead to aliasing, and thus information loss. For instance, in implementations utilizing Binary Phase Shift Keyed (BPSK) signals, information is coded as having either 0° or 180° phase. When doubled, this phase becomes 0° and 360°, making the two phases indistinguishable. But by pre-distorting the transmit signal, or by using odd-multiple phase shift keying, this ambiguity in recovering the phase is resolved. This approach is illustrated in FIG. 5.

Figure 5:
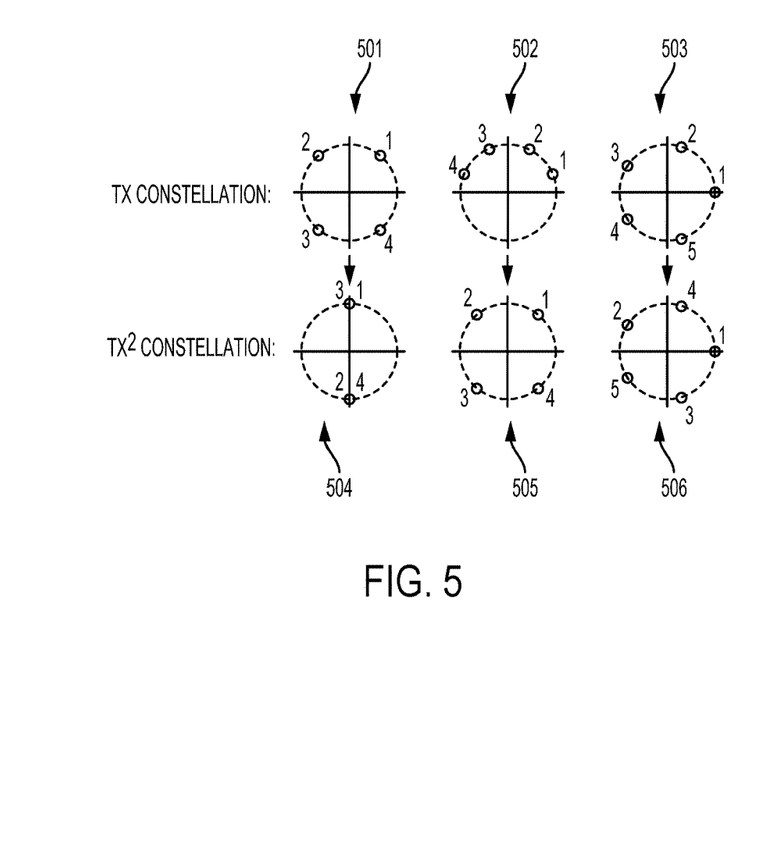
FIG. 5 illustrates various signal modulation constellation diagrams, according to example embodiments.

For instance, the top row of FIG. 5 depicts example transmission phase constellations 501-503 and the bottom row depicts example transmission phase constellations 504-506 after doubling. Constellations 501 and 504 represent unmodified phases. Thus, after doubling the phase states in 501, the phase states in 504 become indistinguishable due to aliasing. Constellations 502 and 505 represent a halving of the phases during transmission. Thus, after doubling phase states in 502, the phase states in 505 are distinguishable. Further, an odd number of phase states, such as those depicted in constellation 503 will not alias and are thus recoverable after doubling, as depicted in constellation 506.

Figure 3:
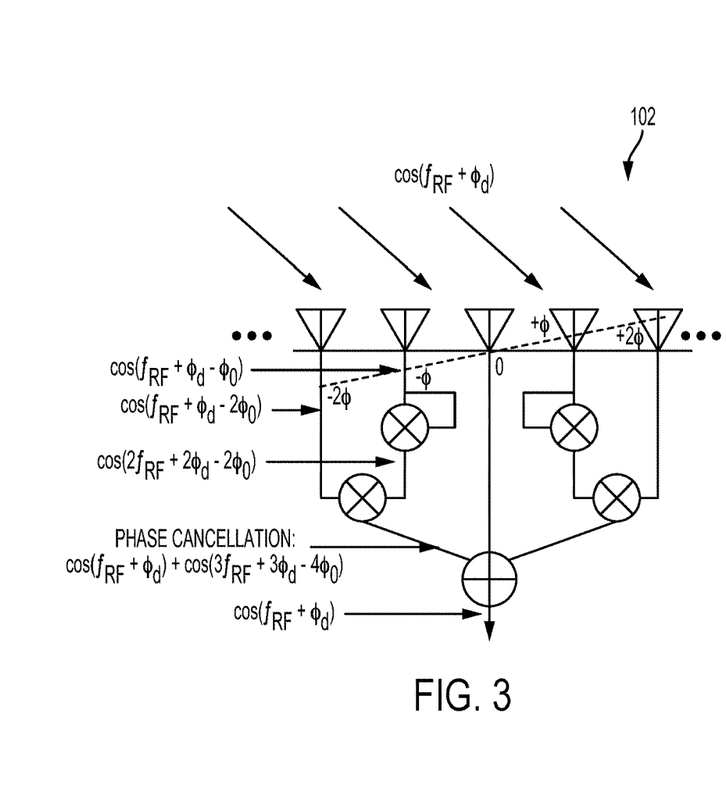
FIG. 3 illustrates a self-steering front end, according to an example embodiment.

In some scenarios, however, it is not feasible to alter the transmitted signal. In such cases, it may still be desirable to prevent phase aliasing in the self-steering network. This can be accomplished using the asymmetric cancellation approach using the self-steering front end 102, as depicted in FIG. 1 and FIG. 3. This architecture tends to be more complicated and include slightly more hardware than the self-steering front end architecture 400 depicted in FIG. 4. Nevertheless, self-steering front end 102 may avoid doubling of the frequency and phase modulations as discussed above. It should be understood that the self-steering front end architectures 102 and 400 described by way of example with reference to FIGS. 1-5 are only example implementations of many possible asymmetric layouts.

Figure 6:
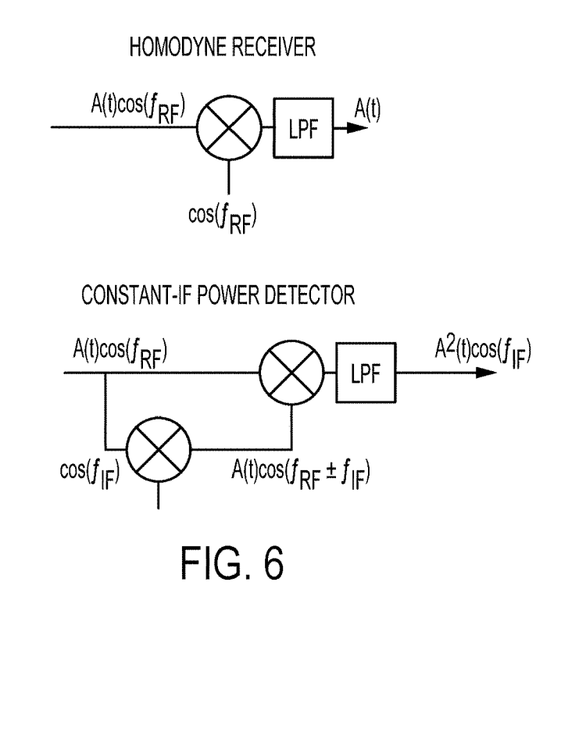
FIG. 6 illustrates a homodyne receiver and a constant-IF power detector, according to example embodiments.
Figure 7:
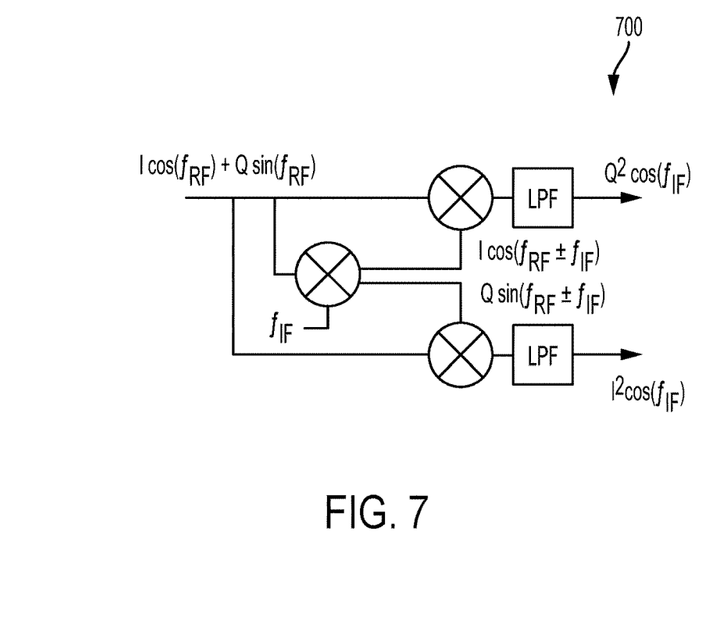
FIG. 7 illustrates a schematic diagram of a down-conversion scenario, according to an example embodiment.

Whereas the self-steering front end is utilized for beamforming, the FIRE may be utilized for down-conversion of the received signal. Unlike homodyne (FIG. 6 (top)) or heterodyne receivers, which require that the incident signal carrier frequency match the frequency of the LO, the architecture disclosed herein may operate without prior knowledge of the carrier frequency, and thus without a LO. In one implementation, and as depicted by the example FIRE 104 in FIG. 1, this is accomplished by applying a copy of the input signal in lieu of the LO for down-conversion. For sine waves, this serves as a power detector (such as the arrangement depicted in FIG. 6 (bottom)), and can be used as such in constant-IF radar. Further, letting the IF frequency drop to DC in the arrangement depicted in FIG. 6 (bottom), this can be accomplished without need for an LO. Similarly, the disclosed technique separates a complex incident signal of unknown frequency into I and Q channels at IF, as depicted in the down-conversion scheme 700 depicted in FIG. 7. While I/Q separation may involve an LO as phase reference, the LO frequency is not related to the RF frequency. This achieves pseudo frequency independent operation while using a low or otherwise convenient LO frequency.

Figure 8A:
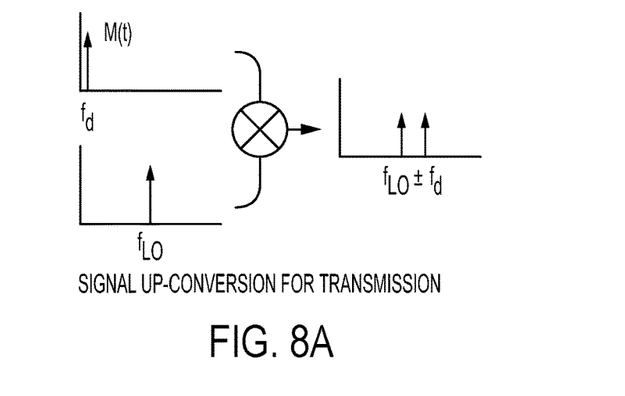
FIG. 8A illustrates a schematic diagram of an up-conversion scenario, according to an example embodiment.
Figure 8B:
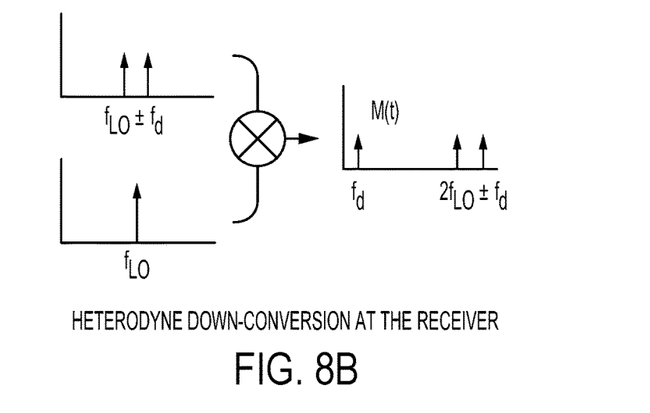
FIG. 8B illustrates a schematic diagram of a heterodyne reception scenario, according to an example embodiment.
Figure 8C:
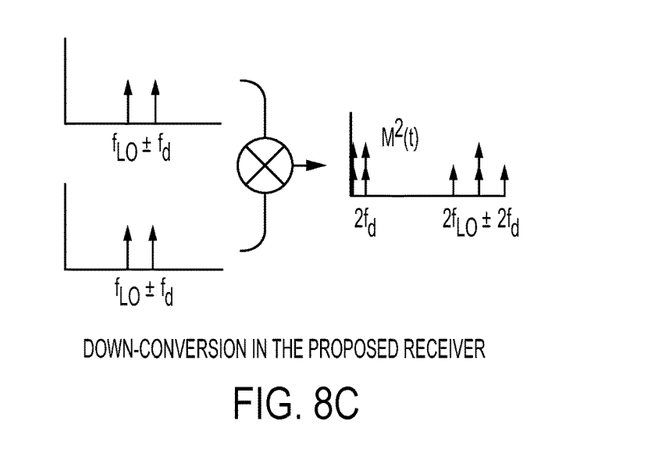
FIG. 8C illustrates a schematic diagram of a heterodyne reception scenario using a frequency-independent receiver, according to an example embodiment.

FIGS. 8A-C further illustrate this process. Specifically, FIG. 8A depicts a typical up-conversion process showing the data signal being mixed with a carrier to produce the transmitted signal. FIG. 8B depicts heterodyne reception, in which the signal from FIG. 8A is present at one input of the mixer, and a local reference is present at the other mixer input. Thus, when the local reference is identical to the carrier, the data signal can be recovered. FIG. 8C depicts reception in accordance with one example of the FIRE disclosed herein, in which the signal from FIG. 8A is present at both inputs of the mixer. Thus, the process recovers the square of the data signal. It should be understood that any of the signals shown may occupy some bandwidth.

As depicted, for modulated signals, the outputs may be squared at baseband. As such, the phase and polarity information may be lost. This issue has been problematic when using this type of receiver for communications applications. That is, besides basic amplitude modulations (ASK, OOK) or modified constellations (as depicted in FIG. 5), such a receiver may not effectively recover data signals. The digital zero-crossing detection technique described herein, however, can be used to recover signal polarity, which advantageously enables the reception of Amplitude/Binary Phase Shift Keyed (ABSPK) signals. The I and Q channels of the quadrature down-conversion scheme 700 (FIG. 7) from complex signals (QPSK, QAM) are likewise purely real ABPSK signals and can be recovered in the same way.

Figure 9A:
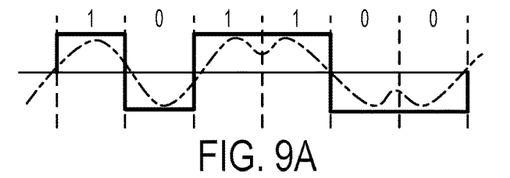
FIG. 9A illustrates a step or block of a digital zero-crossing detection method, according to an example embodiment.
Figure 9B:
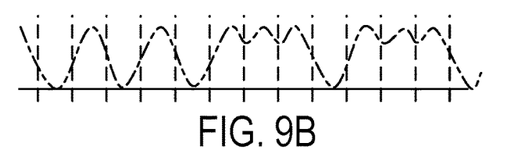
FIG. 9B illustrates a step or block of a digital zero-crossing detection method, according to an example embodiment.
Figure 9C:
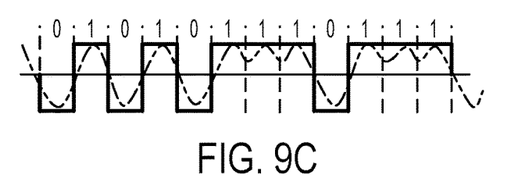
FIG. 9C illustrates a step or block of a digital zero-crossing detection method, according to an example embodiment.
Figure 9D:
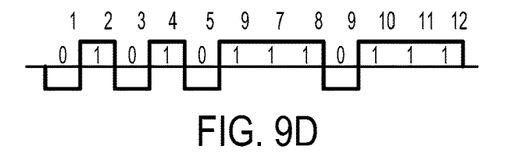
FIG. 9D illustrates a step or block of a digital zero-crossing detection method, according to an example embodiment.
Figure 9E:
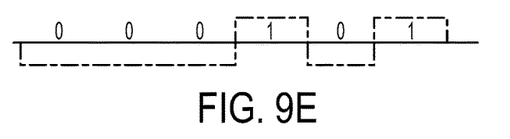
FIG. 9E illustrates a step or block of a digital zero-crossing detection method, according to an example embodiment.
Figure 9F:
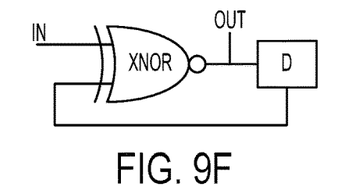
FIG. 9F illustrates a step or block of a digital zero-crossing detection method, according to an example embodiment.
Figure 9G:
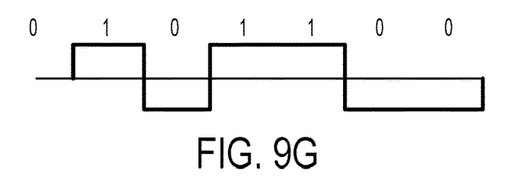
FIG. 9G illustrates a step or block of a digital zero-crossing detection method, according to an example embodiment.
Figure 9H:
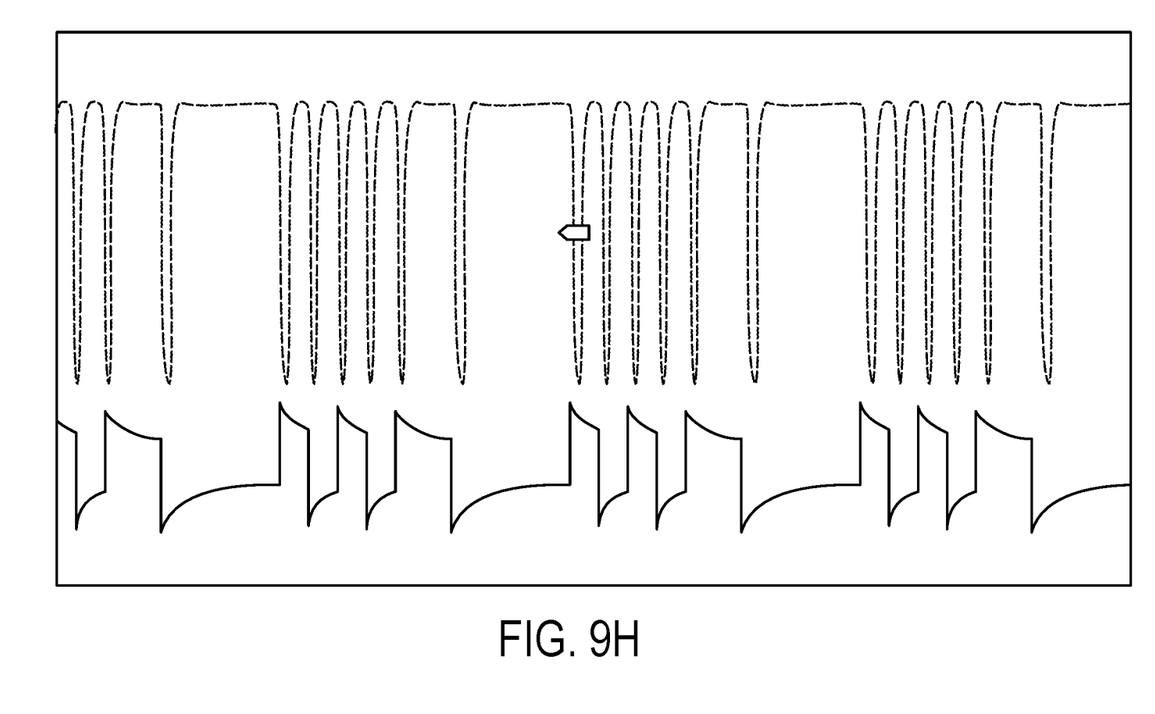
FIG. 9H illustrates a digital waveform and corresponding receiver signal, according to an example embodiment.

As mentioned, polarity information can be recovered from the squared baseband signals using special transmitted waveforms, as discussed in FIG. 5. However, for existing receivers, this may not be an option. Therefore, disclosed below is one implementation of the digital zero-crossing detection technique disclosed herein. The premise of this approach is to detect transitions of the signal state (i.e., 0→1 or 1→0) rather than the current state itself (i.e., 0 or 1). This is demonstrated in FIGS. 9A-G. The steps are as follows:

1. Original data signal is pulse-shaped and transmitted. This is represented by FIG. 9A.
2. Data/signal becomes squared in the receiver. This is depicted by FIG. 9B. After this squaring step, the 1's and 0's of the original data signal are indistinguishable. Both 1 and 0 now appear as a 1. However, every plus/minus transition between those states now corresponds to a 0.
3. Shifting the waveform depicted in FIG. 9B results in the waveform depicted in FIG. 9C.
4. Essentially, the amplitude and phase information of the original signal has now been interleaved on alternating bits, resulting in the doubled bit rate in FIG. 9D.
5. Notably, the amplitude bits convey no additional information and thus can be ignored. Doing so yields the signal depicted in FIG. 9E.
6. The signal depicted in FIG. 9E is the differential form of the signal depicted in FIG. 9A, and can be translated back to the original signal data (as depicted in FIG. 9G) using the example circuit depicted in FIG. 9F, which includes an XNOR gate and a D flip-flop. Alternatively, this circuit can be implemented at the transmitter, so that the signal at step FIG. 9E is the final data output.
7. An image of a simple digital waveform and corresponding squared signal in the receiver is shown in FIG. 9H. It can be observed that the sharp negative pulses correspond to the signal transitions (with some time delay).

III. Beamforming Technique

As a general matter, large, active electronically scanned array antennas (AESA) enable agility and functionality that would be highly inefficient, or even impossible, with mechanically-steered or omnidirectional antennas. However, such arrays are enormously expensive and consume excessive power. The development of low-cost, low-power phased arrays would unlock unprecedented sensing, communications, and EW capabilities for smaller, more ubiquitous platforms.

Further, directive antennas may be desirable for conducting communications or sensing operations at increased distances. However, directive antennas (by design) tend to serve a more limited region of space than non-directive antennas. Therefore, the purpose of electronically steered arrays, as described above, is to provide high directivity while enabling adaptive beam shapes and direction. But, as also mentioned above, the current technology utilizes many expensive and power-hungry components, severely limiting their application. One of the most expensive and inefficient components in an array is the phase shifter. Because phase shifters are required for each element of the array, they therefore grow in number exponentially as the gain of the antenna array increases.

An array architecture that reduces the number of these components, without impacting the array performance is desirable. To that end, disclosed herein is an electronically-steered antenna array architecture that enables a significantly-reduced number of hardware components. This will be described further herein with particular emphasis on radio frequency transmitters, but it should be understood that the present disclosure is extensible to other modalities and operations as well.

As mentioned, one of the largest sources of cost and inefficiency in current AESAs is the phase shifters. These can represent up to 40% of the cost of an AESA. In a typical implementation, one phase shifter is used with each element of the AESA. Thus, an AESA of 5000 elements uses 5000 phase shifters. But using the architecture disclosed herein, this could be reduced to a mere 140 phase shifters, thus representing a 97% reduction in hardware.

Figure 10A:
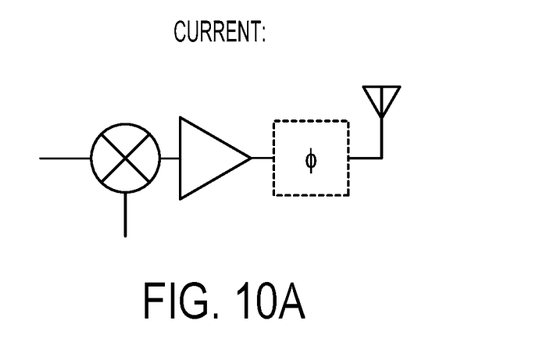
FIG. 10A illustrates a schematic diagram of a phase shifting scenario, according to an example embodiment.
Figure 10B:
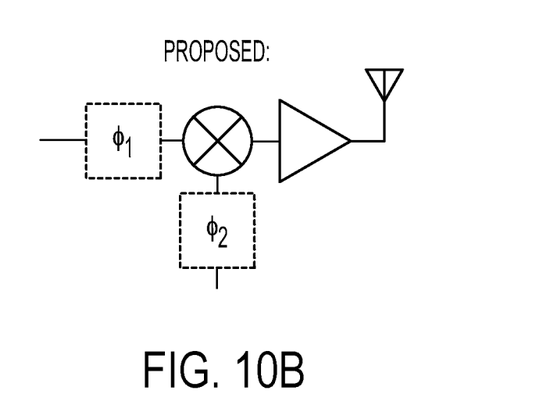
FIG. 10B illustrates a schematic diagram of a phase shifting scenario, according to an example embodiment.

In practice, phase shifting is typically applied directly to the up-converted RF signal at each element, as depicted in FIG. 10A. In accordance with one embodiment of the architecture described herein, FIG. 10B depicts an alternate approach. In FIG. 10B, two independently phased signals $\phi_1$ and $\phi_2$ are combined in a mixer, such that the output carries the sum of the two phases. Thus, in a multi-element array, the hardware reductions mentioned above can be realized by sharing both phased signals with other elements, as depicted by the array 1100 in FIG. 11.

Figure 11:
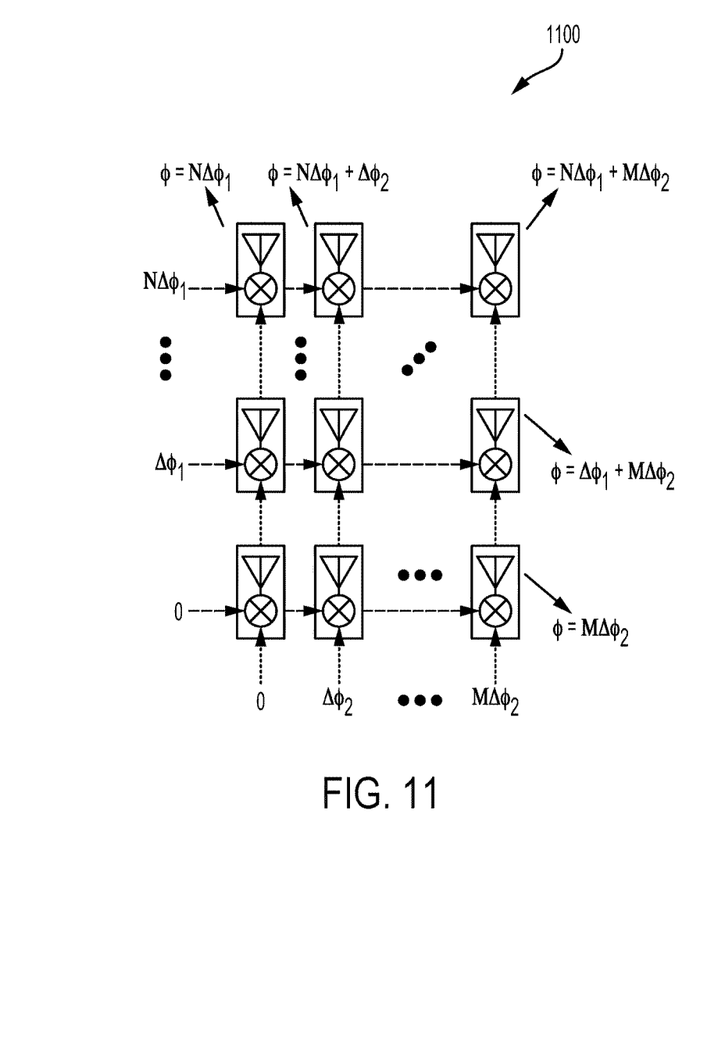
FIG. 11 illustrates a schematic diagram of a phase shifting scenario using a multi-element array, according to an example embodiment.

Specifically, the two-dimensional phase distribution of array 1100 (of size M×N) is decomposed into the superposition of two orthogonal one-dimensional phase distributions (of size M and N respectively). That is, each phase shifter is shared among many elements (for instance a row or column), but any given pair of phase shifters uniquely corresponds to a single element. This is accomplished by taking advantage of the property of mixers, that the up-converted output signal will have a phase equal to the sum of the input phases. Thus, for each element in the array 1100 phase shifts are applied to both inputs of the mixer.

Figure 12:
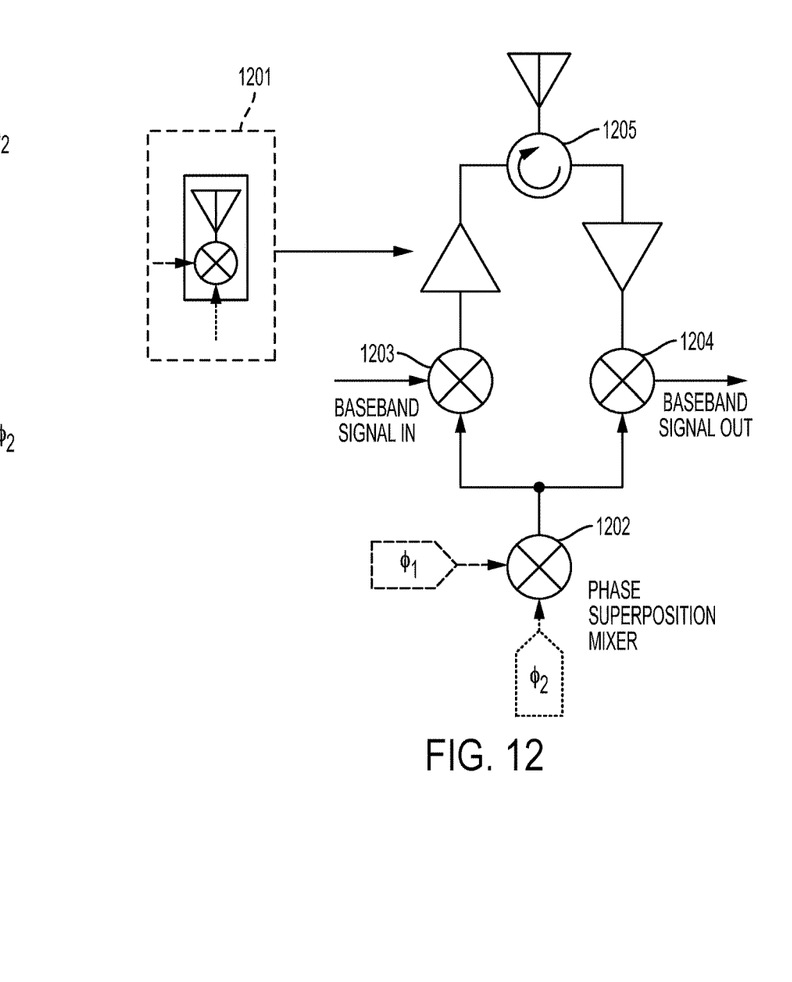
FIG. 12 illustrates a schematic diagram of a system, according to an example embodiment.

Advantageously, the example array 1100 is suitable for transmission and reception. As depicted in FIG. 12, in one implementation, an example element 1201 may be comprised of a circulator 1205, a phase superposition mixer 1202 (as described above), and two baseband signal mixers 1203 and 1204. Further, array 1100 is also compatible with any form of phase shifting (i.e. digital, time delay, reflective, Rotman lenses), and supports complex phasing patterns (i.e. null-steering, Chebyshev distribution, etc). Additionally, phase shifting and LO distribution occurs at a lower frequency, easing synchronization and reducing loss. This may be useful in applications that utilize millimeter-wave arrays, which could now be built using existing Ka-band components.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An antenna array comprising:
a plurality of antenna elements arranged in a matrix, the matrix having a number of columns and a number of rows, wherein each antenna element of the plurality of antenna elements exists at a position within the matrix at an intersection of a column and a row and wherein each antenna element of the plurality of antenna elements comprises a mixer configured to produce a phased superposition mix of a first signal and a second signal, wherein each antenna element comprises:
a respective antenna;
an output mixer coupled to the respective antenna and configured to produce a mix between a signal incident at the respective antenna and the phased superposition mix of the first signal and the second signal; and
an input mixer coupled to the respective antenna and configured to produce a mix between a third signal and the phased superposition mix of the first signal and the second signal;
a first set of phase shifters, each phase shifter of the first set of phase shifters being configured to apply a respective phase shift to an input signal; and
a second set of phase shifters, each phase shifter of the second set of phase shifters being configured to apply a respective phase shift to an input signal,
wherein the first set of phase shifters are arranged such that the first signal is applied with a same phase shift to each mixer of each antenna element in a respective column of the matrix, and
wherein the second set of phase shifters are arranged such that the second signal is applied with a same phase shift to each mixer of each antenna element in a respective row of the matrix.

2. The antenna array of claim 1,
wherein the first set of phase shifters comprises a number of phase shifters equal to the number of columns in the matrix, and
wherein the second set of phase shifters comprises a number of phase shifters equal to the number of rows in the matrix.

3. The antenna array of claim 1, wherein the third signal is a baseband input signal.

4. A method comprising:
applying a first signal to each antenna element of a plurality of antenna elements, the plurality of antenna elements being arranged in a matrix, the matrix having a number of columns and a number of rows, wherein each antenna element of the plurality of antenna elements exists at a position within the matrix at an intersection of a column and a row, wherein each antenna element comprises:
a respective antenna;
an output mixer coupled to the respective antenna and configured to produce a mix between a signal incident at the respective antenna and a phased superposition mix of the first signal and the second signal; and
an input mixer coupled to the given antenna and configured to produce a mix between a third signal and the phased superposition mix of the first signal and the second signal; and
applying a second signal to each antenna element of the plurality of antenna elements;
shifting a phase of the first signal such that for each application of the first signal to mixers positioned in a given column of the matrix, the first signal is applied with a same phase shift;
shifting a phase of the second signal such that for each application of the second signal to mixers positioned in a respective row of the matrix, the second signal is applied with a same phase shift; and
at each respective antenna element of the plurality of antenna elements, mixing the phase-shifted first signal applied to the respective antenna element with the phase-shifted second signal applied to the respective antenna element.

5. The method of claim 4, wherein the step of shifting the phase of the first signal such that for each application of the first signal to mixers positioned in a respective column of the matrix, the first signal is applied with the same phase shift comprises: shifting the phase of the first signal using a number of phase shifters equal to the number of columns in the matrix.

6. The method of claim 4, wherein the step of shifting the phase of the second signal such that for each application of the second signal to mixers positioned in a respective row of the matrix, the second signal is applied with the same phase shift comprises: shifting the phase of the second signal using a number of phase shifters equal to the number of rows in the matrix.

7. The method of claim 4, wherein the third signal is a baseband input signal.

* * * * *